United States Patent [19]

Eldridge, Sr.

[11] 4,103,527
[45] Aug. 1, 1978

[54] ROLL CRIMP MACHINE

[75] Inventor: John S. Eldridge, Sr., Schenectady, N.Y.

[73] Assignee: General Electric Company, Schenectady, N.Y.

[21] Appl. No.: 798,850

[22] Filed: May 20, 1977

[51] Int. Cl.² .................... B21D 39/04; B21D 17/04
[52] U.S. Cl. ........................................ 72/75; 72/121
[58] Field of Search ................. 72/75, 121; 29/517, 29/234

[56] References Cited

U.S. PATENT DOCUMENTS

| 1,951,063 | 3/1934 | Reimann et al. | 72/75 |
| 2,048,598 | 7/1936 | Christiansen | 72/75 |
| 3,068,563 | 12/1962 | Reverman | 29/517 |

Primary Examiner—Lowell A. Larson
Attorney, Agent, or Firm—James W. Mitchell; John F. Ahern

[57] ABSTRACT

An apparatus is described for forming a circumferential annular groove into a round workpiece. The workpiece may comprise two or more cylindrical members to be joined together in an overlapping relation by means of a rolled annular crimp. The apparatus or machine includes a portable main body part having an annular platform rotatable within the main body part about a centerline axis. The annular platform inner circumference defines a co-axial bore into which a workpiece may be received. A ball bearing is introduced part-way into the bore in the radial direction to contact the workpiece whereby a circumferential groove may be formed into the workpiece. The depth of the groove may be automatically controlled and the apparatus itself is circumferentially mounted about the workpiece to facilitate the application of the apparatus to the workpiece. The roll crimp machine is particularly useful in attaching hoses to plumbing nipples as for example, the on site or factory installation of water cooling hoses in a large dynamoelectric machine.

5 Claims, 7 Drawing Figures

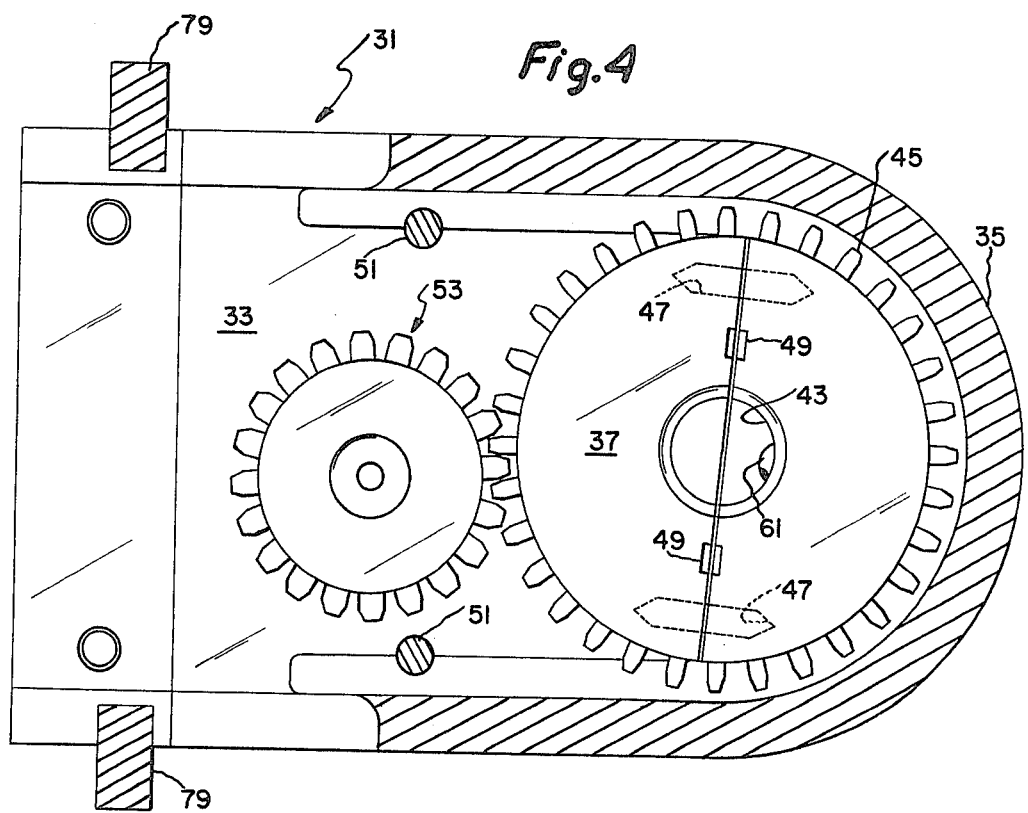
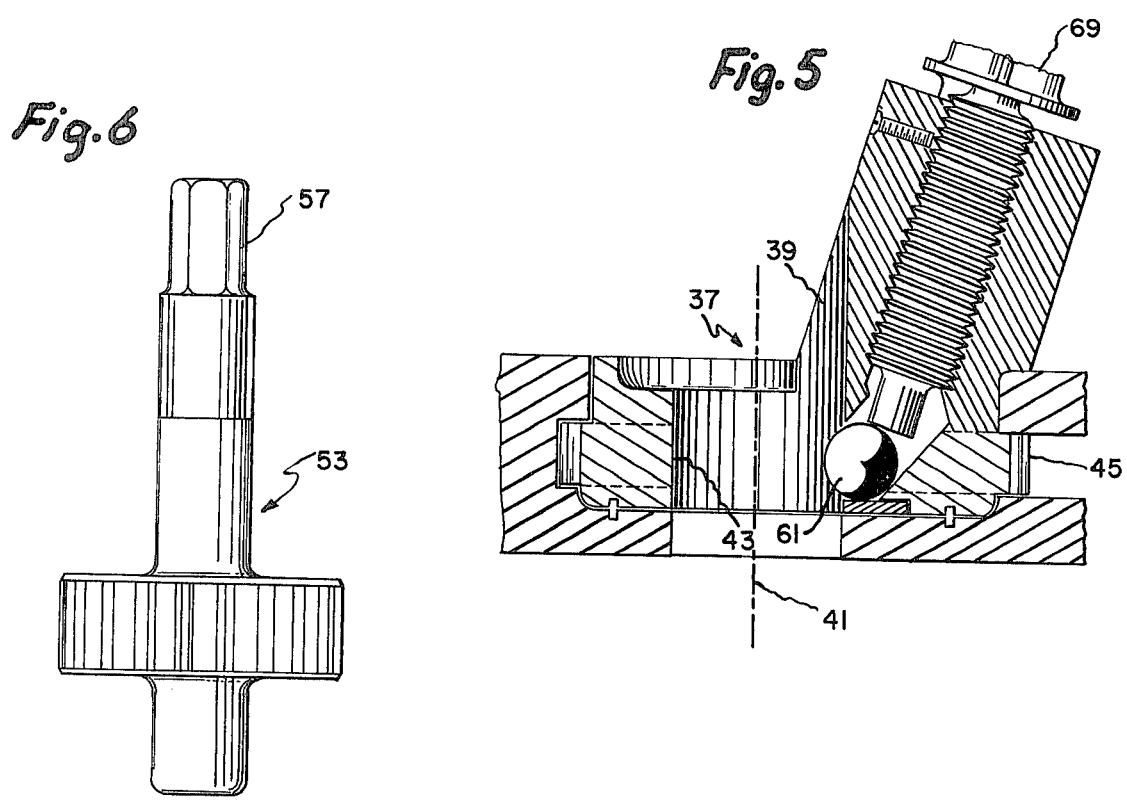

ROLL CRIMP MACHINE

BACKGROUND OF THE INVENTION

This invention generally relates to a portable manufacturing tool for connecting plumbing fittings to hardened hose ends and, in particular, this invention provides a means for forming an overlapping joint among piping members by roll forming an annular crimp into the circumference of the joint.

While it will be understood that the present invention may have a wide variety of useful and commercial applications, one such application is in the manufacture of large dynamo-electric machines of the type shown in U.S. Pat. No. 3,755,702 to Willyoung issued Aug. 28, 1973. The dynamoelectric machine shown in that patent includes a liquid cooled stator 19. In a single pass machine, liquid coolant (usually water) enters an inlet manifold ring 31, and then is transmitted to the individual stator bars through a plurality of hoses 26, exits the machine through a plurality of hoses 27 connected to an outlet manifold ring 35 for transport back to a reservoir for recirculation back to the inlet manifold ring. Such a machine might have on the average one hundred hoses. It is imperative that the hoses and connections be leakproof and therefore rigorous testing standards are applied.

In the prior art method of manufacture, a hose was prefabricated with a fitting on each end. These fittings were then brazed to appropriate connection points from the headers to the stator bars. The brazing operation became the only feasible way of making the appropriate connections since the preformed hoses and fittings were not always matched to the realities of the distances between connection points. Thus brazing gave some latitude with respect to manufacturing tolerances. One reason for the prefabrication of fittings to the hose ends was that it was believed that a leak-proof connection between a hose end and a fitting could only be accomplished by using a large hydraulic stamping machine which would apply instantaneous circumferential pressure around the hose and the fitting to form a stamped joint. There is however, considerable disadvantage in the prior art as thus described. One disadvantage is that a brazing operation within the confines of the end winding system of a dynamoelectric machine can be described as cumbersome, at best, and near impossible under some circumstances. Another disadvantage is the risk of damage to the hose itself or the connection between the hose and fitting during the brazing operation.

SUMMARY OF THE INVENTION

The invention is used to form an annular groove or crimp on a cylindrical workpiece. More particularly, the invention is useful in forming a circumferential joint around two overlapping members. The joint is formed by rolling a spherical ball bearing about the workpiece and applying continuous pressure in the radial direction with respect to the workpiece. The invention is embodied in an apparatus which is portable and may be hand held. Likewise, the apparatus may be power driven or manually operated.

The apparatus includes an annular, rotatable platform which may be disassembled into sections so that it may be applied about the workpiece from the circumferential direction. The annular platform is rotatable about a centerline axis and the inner annulus of the platform defines a co-axial bore which then encloses the workpiece. There is a window formed in the inner circumference (annulus) of the rotatable platform through which the spherical ball bearing protrudes into the co-axial bore to contact the outer circumference of the workpiece. The window is small enough to retain the ball bearing and the spherical ball bearing is used to gradually roll a crimp or groove into the workpiece and the depth of the crimp or groove is determined by the amount the spherical ball bearing protrudes into the co-axial bore. Means are provided for automatically advancing the ball bearing toward the workpiece including means for stopping additional advancement of the ball bearing after a predetermined depth of groove has been reached.

In one application, the present invention may be used to attach water hoses between stator bars and a water header in a large dynamoelectric machine. The invention is advantageous in that it permits each hose to be individually cut to the required length between fittings and further does not require any brazing to complete the connections.

OBJECTS OF THE INVENTION

It is one object of the present invention to provide a portable tool for forming a rolled crimp joint between two or more overlapping members.

It is another object of the present invention to provide a portable tool for forming a rolled crimp joint which may be applied about the circumference of a workpiece from a radial direction.

It is another object of the invention to provide an apparatus for joining two or more overlapping members with a circumferential roll crimp joint wherein the depth of crimp is automatically controlled.

Other objects, advantages and features of the present invention will become apparent from the following description of a preferred embodiment thereof when read in connection with the accompanying drawings.

BRIEF DESCRIPTION OF THE DRAWINGS

FIG. 4 is a plan view in section of the base section and strap section of the apparatus along with the rotatable platform and driving gear.

FIG. 5 is an assembled view of the rotatable platform and housing in elevation cross section.

FIG. 6 is an unassembled view of the driving gear.

DETAILED DESCRIPTION OF THE INVENTION

Figure 1:
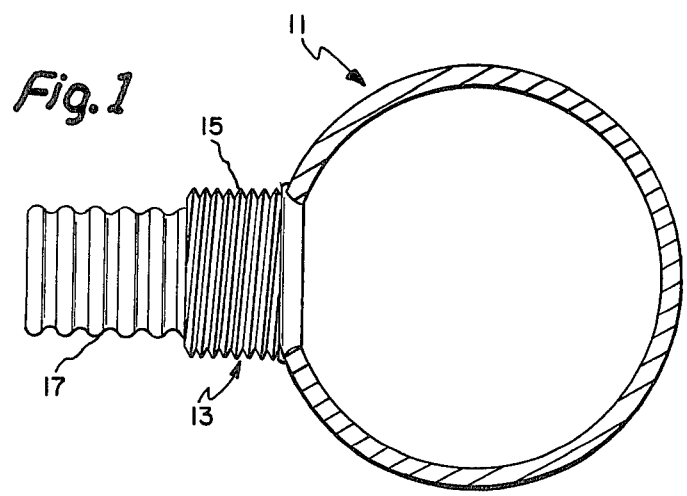
FIG. 1 shows a water header or manifold ring in cross section and further shows one of a plurality of plumbing fixtures to which the water hose may be attached.

The described invention is useful in forming circumferential groove around a round workpiece and in particular for forming a rolled crimped joint around a pair of overlapping tubular members. However, to bring the invention from the abstract to reality the present invention is described in terms of particular joint shown in FIGS. 1 and 2 found within a large dynamoelectric machine of the type shown in U.S. Pat. No. 3,755,702 to Willyoung issued Aug. 28, 1973 and incorporated in the present application by reference. The following discussion is intended to be illustrative and not limiting with respect to the present invention.

In the aforementioned patent, a dynamoelectric machine includes a water cooled stator 19 which includes bar windings 22 having end turns 22b and 22c. A plurality of hoses 26 and 27 interconnect the end turns 22b and 22c respectively, with ring manifold headers 31 and 35 which provide annular collectors for water coolant entering and leaving the stator.

Figure 2:
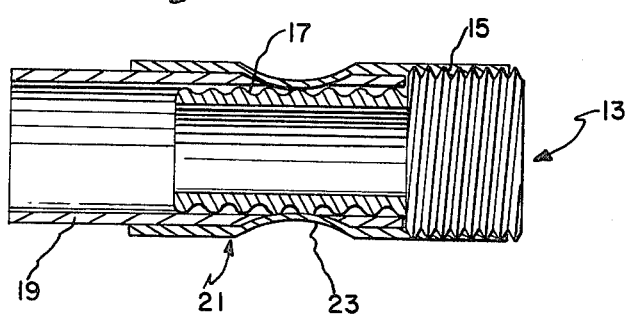
FIG. 2 shows a completed rolled crimp joint of a water hose to a plumbing fixture.

Such a ring manifold header is shown in elevation cross-section in FIG. 1 of the present application and is identified by the numeral 11. Attached to the header is a plumbing fixture 13 which may be brazed or welded to the manifold ring prior to assembling the hose to the plumbing fixture. As it has been already explained, the prior art required that plumbing fixture 13 first be attached to the hose and then brazed into the header ring 11. This sequence allowed some tolerance between the required hose length and the actual hose length. However, the brazing operation was often difficult and the preformed connection between the hose and the plumbing fixture was at risk due to the heat required for the brazing operation. Plumbing fixture 13 itself is hollow, as shown in FIG. 2, to permit the flow of water through the joint.

The fixture 13 is also formed with a threaded boss section 15 and a knurled sleeve 17. FIG. 2 shows the plumbing fixture 13 removed from the header. In attaching a hose 19 to the plumbing fixture, a ferrule 21 is axially inserted over sleeve 17 and threaded onto boss 15. Thereafter the hose 19 is inserted axially between the ferrule 21 and the sleeve 17. The apparatus of the present invention is then radially or circumferentially applied to the workpiece around the outer circumference of the ferrule and a rolled crimp 23 is formed into the ferrule. The rolled crimp 23 is an annular or circumferential groove which causes the joined members to hold together. The hose 19 may be typically formed from a hardened rubber or plastic material.

Figure 3:
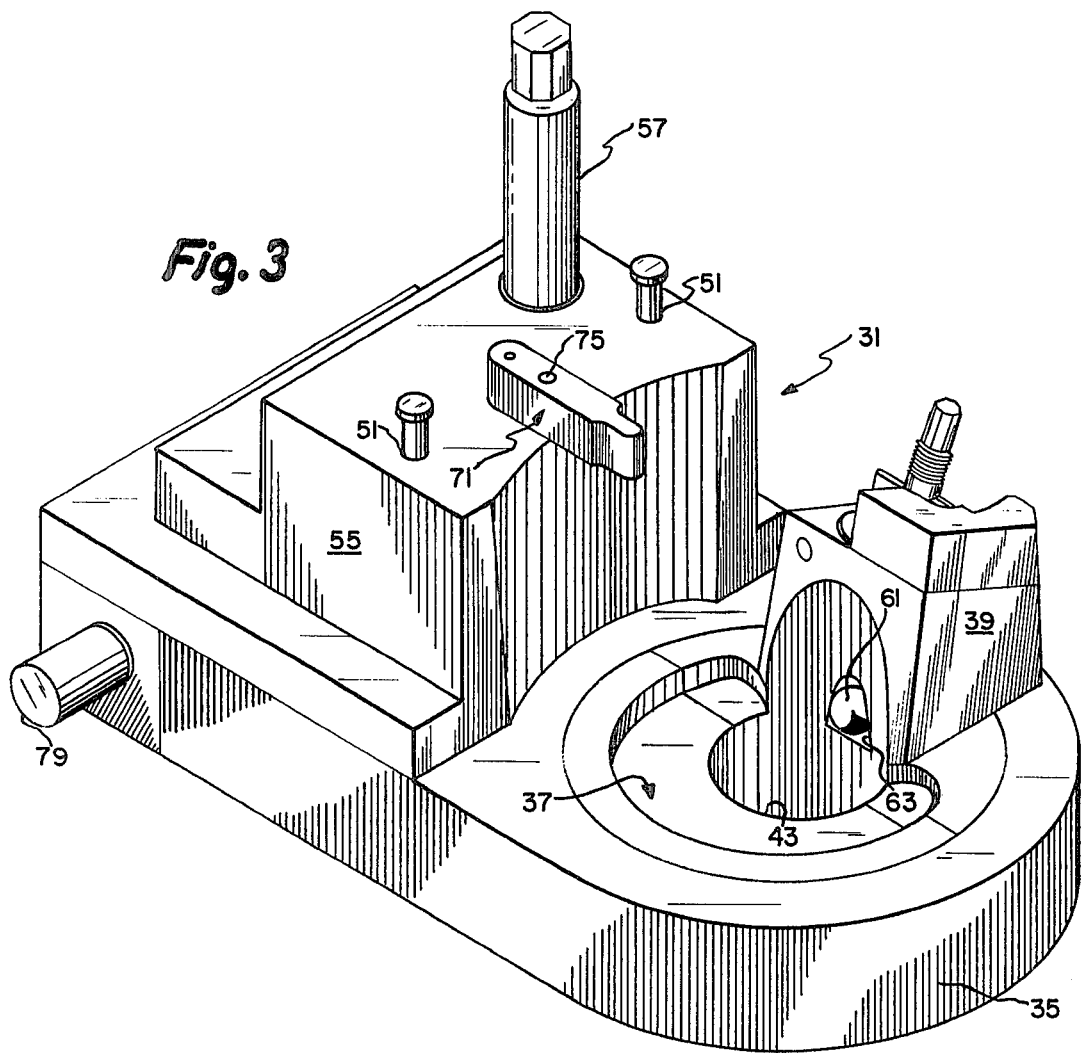
FIG. 3 is an isometric view of the apparatus according to the present invention.

FIG. 3 is an isometric drawing of an apparatus according to the present invention used in forming the aforedescribed rolled crimp joint. The apparatus is comprised of a main body part 31 which includes a base section 33 and a strap section 35 (FIG. 4). The base section and the strap section are assemblable and disassemblable with respect to one another and when assembled the two sections define a cage for retaining an annular, rotatable platform 37. The rotatable platform is clearly shown in FIG. 5 which is an elevation cross section of the platform.

The annular, rotatable platform has a housing 39 attached to and rotatable with the platform. The platform and housing are rotatable around a centerline axis 41 which also is the centerline axis of a bore 43 which defines the inner circumference or inner annulus of the annular platform. The outer circumference or outer annulus of the rotatable platform is defined by a driven gear ring 45.

The rotatable platform is assemblable and disassemblable into two section halves. The section halves are aligned with one another by means of pins 47. The rotatable platform is assemblable and disassemblable along with the base section and strap so that the apparatus may be applied radially or circumferentially about the workpiece or members to be joined. Slots 49 are provided for prying to two platform halves apart.

The base section 33 is a peninsula shaped section which mates with the "U" shaped strap section 35, the two sections being held together by pins 51. The base section also encloses a driving gear 53 which meshes with ring gear 45 on the annular platform. The driving gear 53 is mounted within a pedestal 55 which is attached to the base section. The driving gear includes a driving spindle 57 which protrudes through an opening in pedestal 55. Driving spindle 57 may either be hand cranked or machine cranked. The disassembled driving gear is shown in FIG. 6.

Returning to FIG. 5, housing 39 is rotatable about the centerline axis 41 with the annular platform 37. A spherical ball bearing 61 is caged within the annular platform and housing. The ball bearing protrudes into the bore 43 through a window 63 formed on the inner circumference of the annular platform. The ball bearing is urged radially inwardly into the bore through the window by means of a threaded rod 65.

Figure 7:
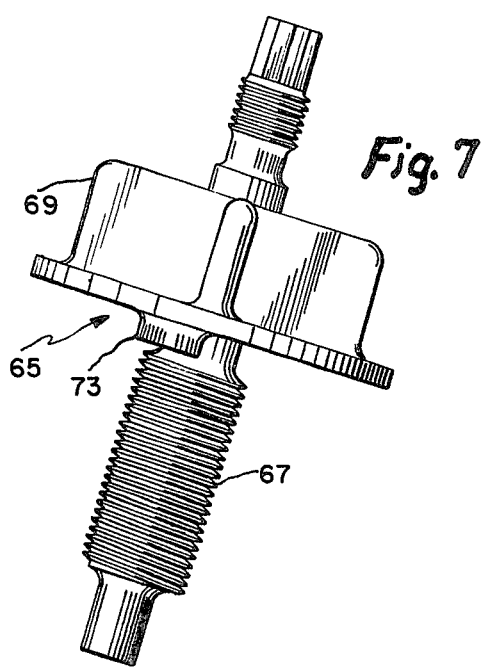
FIG. 7 is an unassembled view of the threaded rod and star wheel.

In FIG. 7, threaded rod 65 is shown disassembled from the housing 39 and includes a threaded portion 67 and a star wheel 69. The star wheel 69 is fixed to the threaded rod and arranged so that the threaded rod is advanced a quarter-turn each time the annular platform rotates a full turn.

This is accomplished in combination with pivoted lever 71 which is mounted on pedestal 55. As the housing 39 rotates with the annular platform 37 it will pass lever 71 once each full turn. As lever 71 contacts star wheel 69, the star wheel will turn one-quarter turn since the star wheel may be divided into four ribs. The limit to the inward movement of rod 67 is set by a stop 73 on the underside of the star wheel which strikes the housing 39. When stop 73 engages the housing 39, lever 71 which is pivotal about pin 75 will be rotated out of the position shown in FIG. 3 so that it will no longer contact the star wheel. Lever 71 may include a spring, ball and detent mechanism which will release only after stop 73 engages housing 39. Thus the depth of the rolled crimp may be automatically controlled as well as the rate at which the groove of the crimp is formed. Prongs 79 may be provided on the apparatus to accept a handle (not shown) for holding and maneuvering the apparatus.

The operation of the apparatus is as follows. It is desired to form an annular or circumferential joint about at least two overlapping round or tubular members. The members are axially assembled. The apparatus of the present invention is applied about the circumference of the workpiece by first assembling the rotatable, annular platform radially on the workpiece and then assembling the base and strap sections around the platform. This obviously facilitates removal of the apparatus from the workpiece after the workpiece has been attached at both ends.

After the apparatus has been attached to the workpiece, the driving gear is turned to rotate the annular platform around the workpiece as the threaded rod is gradually advanced inwardly to move the spherical ball bearing radially toward the workpiece. As the spherical ball bearing is advanced toward the workpiece circumference a rolled crimp or groove is formed of sufficient depth to provide an annular joint between the members to be fastened.

While there has been shown what is considered to be the preferred form of the invention, it is, of course, understood that various other modifications and uses will occur to those of ordinary skill in the art. It is intended to claim all such modifications as fall within the true spirit and scope of the invention.

What is claimed is:

1. An apparatus for joining two or more round members in an overlapping relation comprising:
   a main body part;
   an annular platform rotatably supported within said main body part, said platform being rotatable about a centerline axis and having a co-axial bore formed therethrough;
   a ball bearing disposed within said annular platform and rotatable therewith about the centerline axis;
   a window formed in the inner circumference of said annular platform; and,
   means for automatically advancing said ball bearing through said window and into said bore as the annular platform is rotated relative to the main body part whereby as the annular platform is rotated a circumferential groove is formed about said round members insertable in said bore to form a roll joint between the members.

2. An apparatus for joining two or more round members in an overlapping relation comprising:
   a main body part comprising a base section and a strap section disassemblable from one another;
   an annular platform disposed within said main body sections, said platform being rotatable about a centerline axis and having a co-axial bore formed therethrough; said annular platform disassemblable into at least two parts whereby the apparatus may be circumferentially applied to the members to be joined;
   a ball bearing disposed within said annular platform and rotatable therewith about the centerline axis;
   a window formed in the inner circumference of said annular platform; and,
   means for advancing said ball bearing through said window and into said bore whereby as the annular platform is rotated a circumferential groove is formed about said round members insertable in said bore to form a rolled joint between the members.

3. The apparatus recited in claim 2 wherein the annular platform includes a gear ring defining the outer circumference of the platform annulus, said apparatus further comprising:
   a driving gear within said main body part connected to said gear ring; and,
   a driving gear spindle connected to said driving gear for transmitting a power input to the gear ring.

4. An apparatus for joining two or more round members in an overlapping relation comprising:
   a main body part;
   an annular platform disposed within said main body part, said platform being rotatable about a centerline axis and having a co-axial bore formed therethrough;
   a ball bearing disposed within said annular platform and rotatable therewith about the centerline axis;
   a window formed in the inner circumference of said annular platform; and,
   means for advancing said ball bearing through said window and into said bore including: a housing mounted on said annular platform and rotatable therewith; a threaded rod mounted through said housing to contact the ball bearing; a star wheel attached to an outer end of said threaded rod; lever means on said main body part contacting said star wheel at least one during each revolution of said annular platform; stop means for controlling the movement of said rod toward said ball bearing whereby the threaded rod is advanced through the housing toward the ball bearing, the ball bearing is advanced through the window into the bore, and, the depth of the circumferential groove is controlled.

5. An apparatus for forming a circumferential groove into a workpiece comprising:
   a main body part;
   an annular platform disposed within said main body part and disassemblable therefrom, said platform being rotatable about a centerline axis and having a co-axial bore formed therethrough; said annular platform being disassemblable into sections for circumferential mounting about the workpiece;
   a ball bearing disposed within said annular platform and rotatable therewith about the centerline axis;
   a window formed in the inner circumference of said annular platform;
   means for advancing said ball bearing through said window and into said bore whereby as the annular platform is rotated a circumferential groove is formed about said workpiece insertable through said bore.

* * * * *